United States Patent [19]

Ozaki et al.

[11] 4,438,647
[45] Mar. 27, 1984

[54] IGNITION RANGE DETECTOR FOR INTERNAL COMBUSTION ENGINES

[75] Inventors: Tadashi Ozaki, Gamagori; Tadashi Hattori, Okazaki; Hiroaki Yamaguchi, Anjo, all of Japan

[73] Assignee: Nippon Soken, Inc., Nishio, Japan

[21] Appl. No.: 337,247

[22] Filed: Jan. 5, 1982

[30] Foreign Application Priority Data

Jan. 8, 1981 [JP] Japan .................................. 56-705

[51] Int. Cl.³ .......................................... G01M 15/00
[52] U.S. Cl. ................................................ 73/117.3
[58] Field of Search ...................... 73/115, 117.3, 116

[56] References Cited

U.S. PATENT DOCUMENTS 3,364,735 1/1968 Germann ........................... 73/117.3
4,252,013 2/1981 Hyanova et al. ................... 73/117.3

Primary Examiner—Jerry W. Myracle
Attorney, Agent, or Firm—Cushman, Darby & Cushman

[57] ABSTRACT

An ignition range detector for an internal combustion engine is disclosed, in which at each combustion of the internal combustion engine, a pressure signal of a pressure sensor for detecting the pressure in a cylinder is integrated by a signal associated with the crank angle to produce an area $S_1 + S_2$ presenting the combustion state. At the same time, the pressure signal for a hypothetical case of misfire under the same condition is integrated to produce an area $S_1$. It is decided whether the ratio $(S_1 + S_2)/S_1$ is higher than a predetermined value $\alpha$ or not thereby to detect an ignition range always stably regardless of the operating conditions of the internal combustion engine including the load thereon.

6 Claims, 11 Drawing Figures

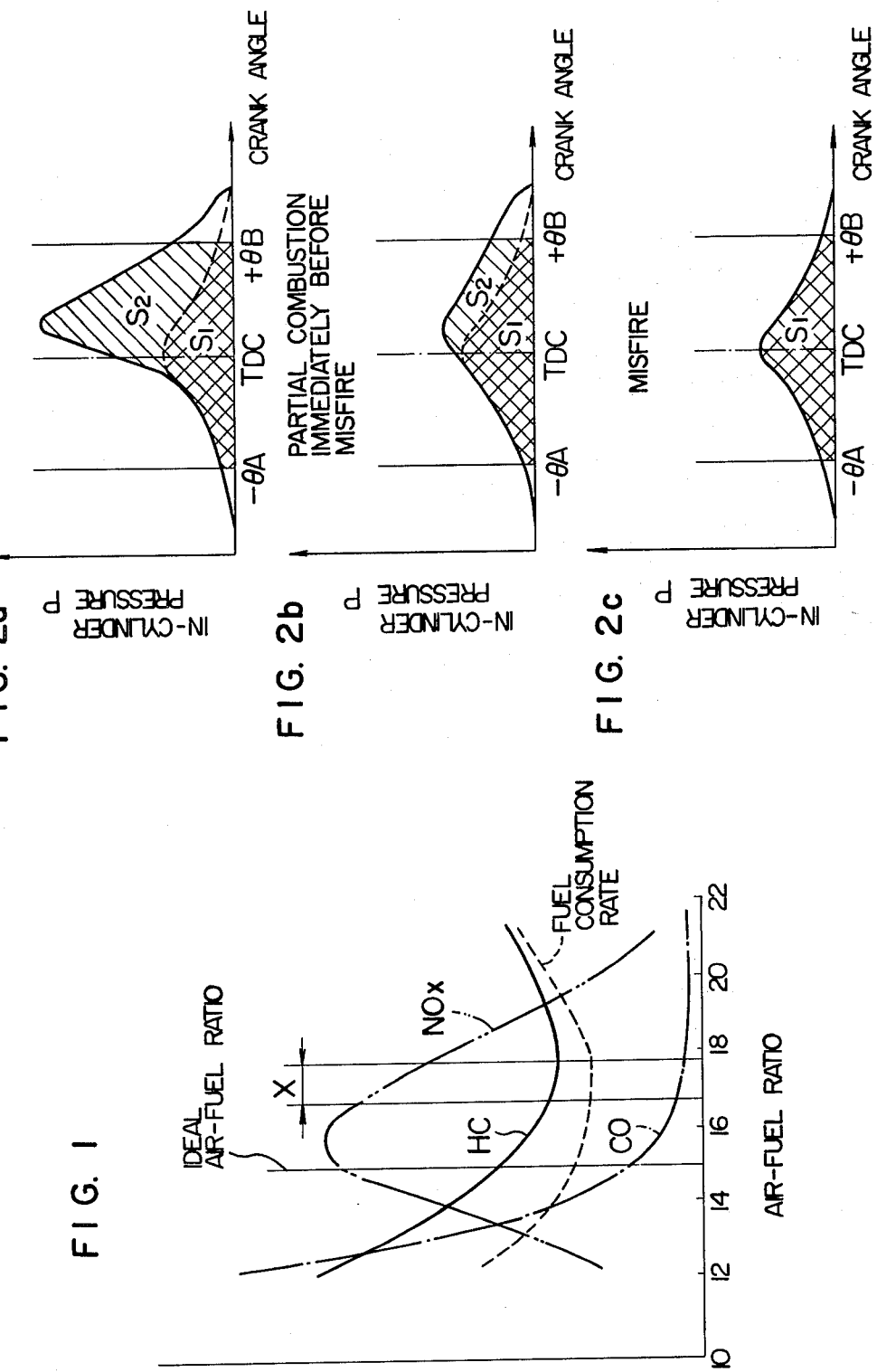

IGNITION RANGE DETECTOR FOR INTERNAL COMBUSTION ENGINES

BACKGROUND OF THE INVENTION

1. Field of the Invention

The present invention relates to an apparatus for detecting an ignition range for an internal combustion engine, or more in particular to an ignition range detecting apparatus for the internal combustion engine which is advantageous for the control of the air-fuel ratio, exhaust gas recirculation (EGR) or ignition timing.

2. Description of the Prior Art

The importance of an ignition range detector will be described below with reference to a conventional method of the air-fuel ratio control.

FIG. 1 is a graph showing the relation between the mixture gas supplied to the combustion chamber of the internal combustion engine, the composition of the exhaust gas and the fuel consumption rate for $NO_x$, $HC$ and $CO$ respectively.

If the mixture of the internal combustion engine is controlled to the neighborhood of the stoichiometrical air-fuel ratio (namely, the air-fuel ratio where complete combustion occurs immediately before HC increases by misfire) in the region X in FIG. 1, the obnoxious components including CO and HC of the exhaust gas are minimized, while $NO_x$ is reduced as compared with the neighborhood of the stoichiometric air-fuel ratio generally employed, so that the exhaust gas is purified advantageously. Further, the fuel consumption rate is minimum in the neighborhood of this stoichiometric air-fuel ratio for economic advantage.

It is thus desirable to control the mixture gas to the neighborhood of the stoichiometric air-fuel ratio which is advantageous from the viewpoint of both purification of the exhaust gas and the economy. It is, however, actually difficult to maintain the stoichiometric air-fuel ratio immediately before misfire always in response to the changes of the operating conditions of the internal combustion engine. As a result, an air-fuel mixture considerably richer than the stoichiometric value is used to assure the ignition of the mixture.

In order to solve this problem, means for detecting the stoichiometric air-fuel ratio just before the misfire is required. A conventional air-fuel ratio sensor for detecting the air-fuel ratio of the mixture gas directly uses a metal oxide semiconductor such as zirconium oxide or zirconia. The zirconia air-fuel ratio sensor, however, is capable of detecting only the neighborhood of the stoichiometric air-fuel ratio (14.5 to 15.0 of the air-fuel ratio in FIG. 1), and incapable of detecting the stoichiometric air-fuel ratio.

Let us discuss about means for detecting the stoichiometric air-fuel ratio just before misfire indirectly. In view of the fact that the stoichiometric air-fuel is associated with the complete combustion immediately before misfire as described above, an air-fuel ratio slightly richer than the one detected immediately before misfire (partial combustion) is detected as the stoichiometric air-fuel ratio. It is therefore possible to detect the stoichiometric air-fuel ratio by means of an ignition range detector for detecting the condition (partial combustion) immediately before misfire. The ignition range detector is useful as will be seen from the foregoing description with reference to the air-fuel ratio.

The difference in combusting conditions is shown by the waveform of pressure in the cylinder of an ordinary internal combustion engine. FIG. 2a denotes the complete combustion of the internal combustion engine, FIG. 2b the partial combustion immediately before misfire, and FIG. 2c misfire.

As will be seen FIGS. 2a to 2c, the area $S_2+S_1$ formed by the cylinder pressure P and the crank angle along the abscissa increases as the combustion is improved to a complete state of FIG. 2a. Therefore, by determining a value equivalent to this area $S_1+S_2$ and comparing it with a predetermined value, it is possible to determine the combustion state. That is, in the state of the partial combustion immediately before misfire as shown in FIG. 2b the area $S_1+S_2$ becomes narrow, and in the state of misfire as shown in FIG. 2c the area becomes $S_1$. Depending on the operating conditions of the internal combustion engine, however, the area representing the combustion state $S_1+S_2$ varies for the same complete combustion.

The difference of cylinder pressure waveform according to the load conditions of an ordinary internal combustion engine is shown in FIG. 3. FIG. 3a shows the high-load combustion state of the internal combustion engine and FIG. 3b the light-load combustion state thereof.

As seen from FIGS. 3a and 3b, the area $S_1+S_2$ representing the combustion state greatly varies depending on the high or low load for the same complete combustion. In the case of complete combustion under light load of FIG. 3b, for instance, the area $S_1+S_2$ is almost equal to the area for the partial combustion immediately before misfire in the case of high load of FIG. 3a. If a predetermined value $\alpha$ of a fixed level is used for comparison, therefore, the decision on the combustion state becomes erroneous. In order to solve this problem, the area $S_1$ concerning the misfire under the same condition is considered. Since the area $S_1$ represents the engine conditions of the internal combustion engine as it is reduced with the decrease of the load, the ratio between the area $S_1+S_2$ representing the combustion state and the area $S_1$ concerning the misfire under the same condition is determined and compared with the predetermined value $\alpha$. As a result, as obvious from FIG. 3, it is determined on a fixed standard whether the partial combustion immediately before misfire or complete combustion is involved regardless of the load. In other words, an ignition range can be determined regardless of the load or other operating conditions.

The area representing the combustion state for misfire cannot be actually determined directly. As seen from FIG. 3, however, the area $S_1'$ of a predetermined part (such as the part from $-\theta A$ to $-\theta C$ in crank angle in FIG. 3) before the explosion/combustion of the mixture gas in compression stroke is proportional to the area $S_1$ for misfire. The area $S_1'$ is determined and multiplied by a predetermined value $K_1$ thereby to obtain the area $S_1$.

In the case where a signal representing the crank angle is divided by N and the pressure signal is digitally processed at points of N divisions so that the resulting values are added to obtain the areas $S_1$ and $S_2$, the cylinder pressure value $P(-\theta D)$ for a predetermined crank angle (such as $-\theta D$) before explosion/combustion of the mixture gas in compression stroke is determined and multiplied by a predetermined value $K_2$, thus producing a value $S_1$ representing the area for misfire.

In the manner mentioned above, the value $S_1$ representing the area for misfire is obtained.

SUMMARY OF THE INVENTION

An object of the present invention is to provide an ignition range detecting apparatus in which for each combustion, the signal of a pressure sensor for detecting the pressure in the cylinder is integrated by a signal representing the crank angle to determine the area $S_1+S_2$ representing the combustion state, while at the same time calculating the area $S_1$ in a hypothetical case of misfire under the same engine condition. It is decided whether the ratio between these two values $(s_1+S_2)/S_1$ is more or less than the predetermined value $\alpha$, so that an ignition range is always detected stably regardless of the operating conditions such as a load of the internal combustion engine.

Another object of the present invention is to provide an ignition range detecting apparatus in which an ignition range affected by the air-fuel ratio, exhaust gas recirculation and ignition timing is detected over a wide range.

BRIEF DESCRIPTION OF THE DRAWINGS

Preferred embodiments of the present invention will now be described in conjunction with the accompanying drawings, in which:

FIG. 1 is a graph showing the relation between the air-fuel ratio, exhaust gas components and fuel consumption rate of an ordinary internal combustion engine;

FIGS. 2a to 2c are graphs each showing the difference of cylinder pressure waveform according to the combustion state of an ordinary internal combustion engine;

DESCRIPTION OF THE PREFERRED EMBODIMENTS

An ignition range detecting apparatus for the internal combustion engine according to the present invention will be described below in detail with reference to an embodiment thereof.

Figure 4:
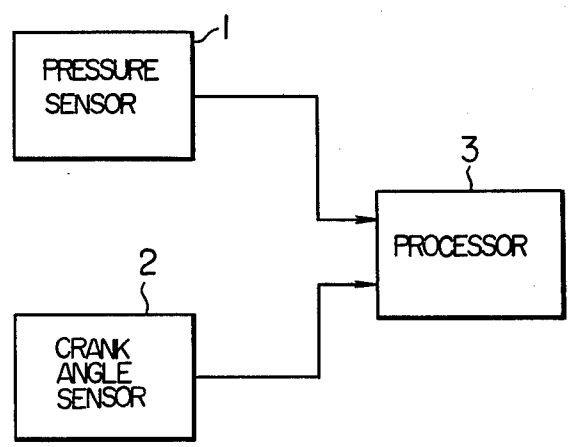
FIG. 4 is a block diagram showing an embodiment of the apparatus of the present invention.

FIG. 4 is a block diagram showing an embodiment of the ignition range detecting apparatus for the internal combustion engine according to the present invention. In FIG. 4, reference numeral 1 designates a pressure sensor for detecting the pressure in the cylinders of the internal combustion engine. Numeral 2 designates a crank angle sensor for detecting a signal representing the crank angle of the internal combustion engine, a signal representing the first angular position I ($-\theta A$) of the internal combustion engine in compression stroke and a signal representing the second angular position II ($+\theta B$) of the internal combustion engine in expansion stroke after the top dead center (TDC). Numeral 3 designates a processor including a computer for processing the pressure signal of the pressure sensor 1 at the time of each combustion, determining the value $S_1+S_2$ by integration of the pressure signal from the first angular position I ($-\theta A$) to the second angular position II ($+\theta B$) in response to the signal representing the crank angle, determining by calculation of the integration ratio $(S_1+S_2)/S_1$ from the integration value $S_1$ of the pressure signal for a hypothetical case of misfire under the same condition, and producing an output in the form of the result of comparison of the ratio with a predetermined value $\alpha$.

Figure 5:
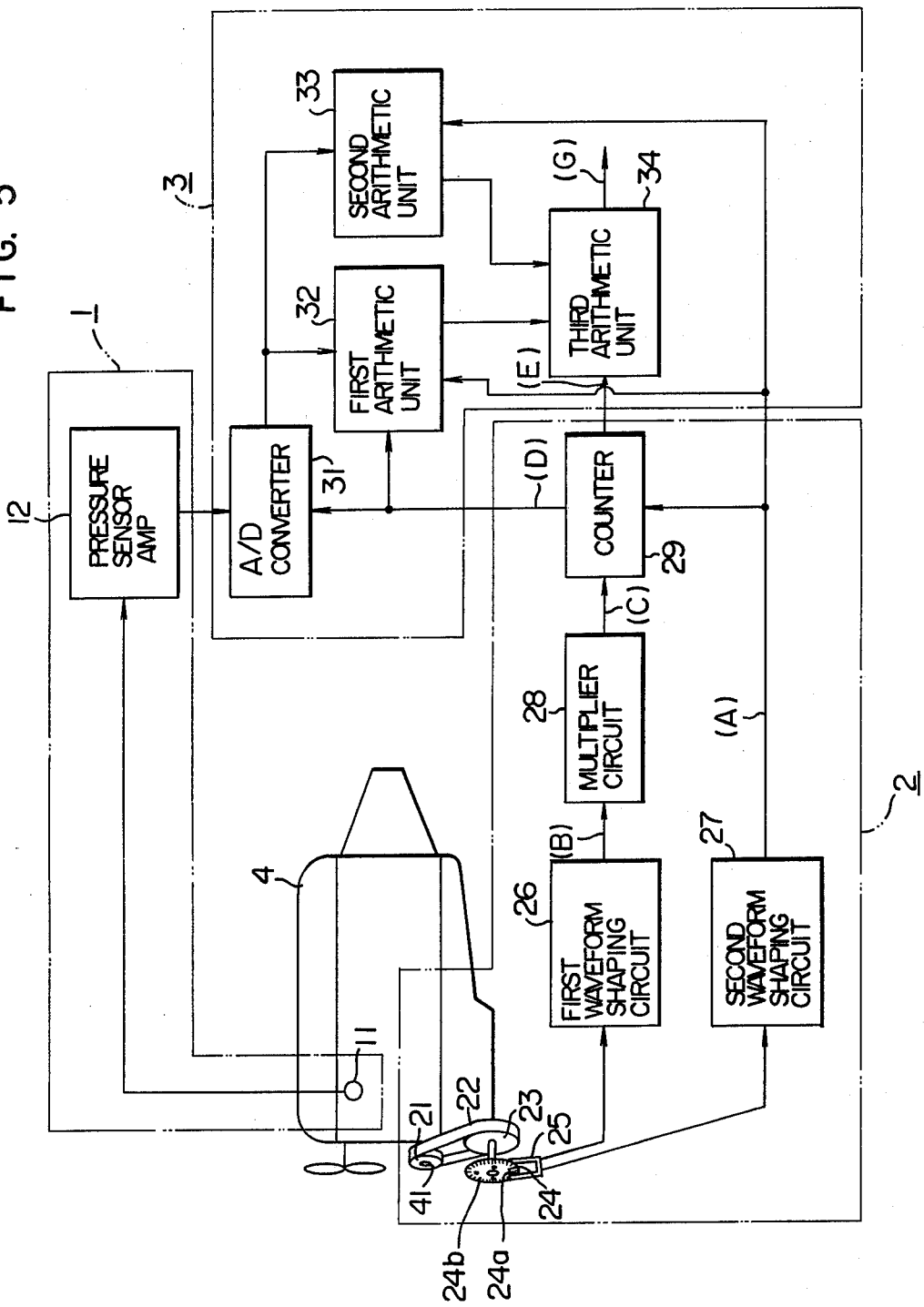
FIG. 5 is a diagram showing the embodiment of FIG. 4 in detail.
Figure 6:
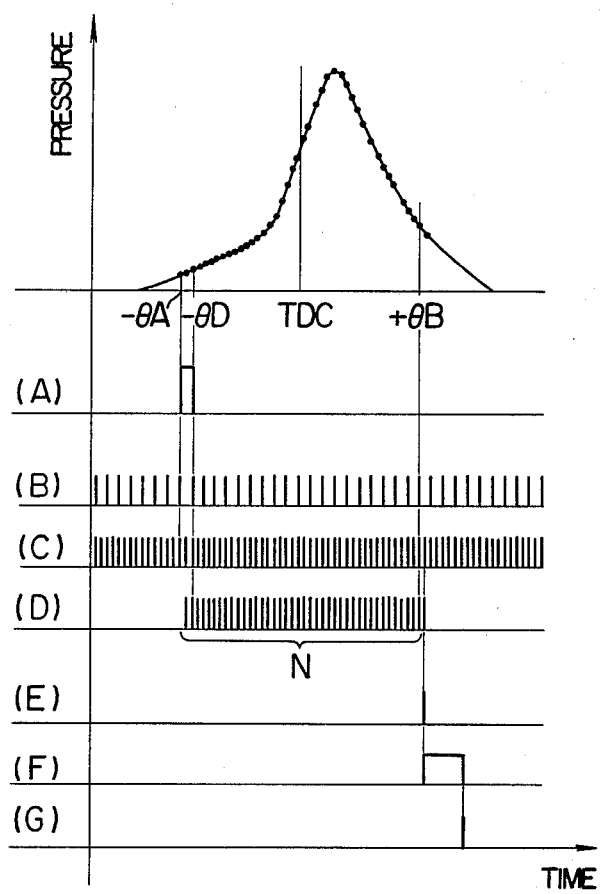
FIG. 6 is a graph showing the operation of the embodiment of FIG. 5.

FIG. 5 shows the circuit of FIG. 4 more in detail, and FIG. 6 a graph showing the operation of each part of the embodiment of FIG. 5. In FIG. 5, numeral 4 designates an internal combustion engine for which an ignition range is to be determined. First, let us explain the configuration of the crank angle sensor 2. Numeral 21 designates a first pulley I directly coupled with the crank shaft 41 of the internal combustion engine 4, which pulley I is connected to the second pulley II by means of the belt 22. The diameter of the second pulley II 23 is double that of the first pulley I 21, so that with two revolutions of the crank shaft 41 of the internal combustion engine 4, the second pulley II 23 makes a revolution. A slit disc 24 is mounted integrally on the second pulley II 23. The slit disc 24 may be mounted integrally on the shaft of a distributor not shown. The slit disc 24 includes slits 24a representing the first angular position I ($-\theta A$) of the internal combustion engine in compression stroke and slits 24b representing each discrete crank angle of the internal combustion engine. The slit disc 24 is combined with a slit detector 25 for detecting the passage of each slit thereof. Two kinds of signals associated with the passage through the slits 24a and 24b detected by the slit detector 25 are supplied to two waveform shaping circuits 26 and 27 respectively for shaping a pulse signal representing the crank angle and a pulse signal associated with the angular position I ($-\theta A$) of the internal combustion engine in compression stroke before top dead center (TDC). Specifically, the slits 24b are formed in the slit disc 24 in such a manner that a slit signal is applied for each 8-degree revolution of the crank shaft, and in response to these slits 24b, the first waveform shaping circuit 26 produces a pulse signal representing the crank angle as shown at (B) in FIG. 6. The second waveform shaping circuit 27, on the other hand, produces a pulse associated with the first angular position $-\theta A$ from the slit 24a having a width formed by two pulses for the crank shaft. The pulse signal associated with the crank angle generated from the first waveform shaping circuit 26 is applied to a multiplier circuit 28. Assume that the slit disc 24 has slits each for 8-degree rotation of the crankshaft and the multiplier circuit 28 has a doubling function. One multiplication pulse is produced from the multiplier circuit 28 for each 4-degree rotation of the crankshaft as shown at (C) in FIG. 6.

The multiplication pulse signal generated at the multiplier circuit 28 is applied to a counter 29. This counter 29 begins to count the multiplication pulse signal as shown at (D) in FIG. 6 with the rise of the pulse signal associated with the angular position I ($-\theta A$) of the internal combustion engine received from the second waveform shaping circuit 27. Upon completion of the counting of a preset value N on the multiplication pulses generated up to the angular position II ($+\theta B$) from the angular position I ($-\theta A$), a pulse signal as shown at (E) in FIG. 6 is applied to the arithmetic unit 34 of the processor 3. The counter 29 applies, during the counting operation, multiplication pulse signals to the A/D converter 31 and the arithmetic unit 32 of the processor 3 as shown at (D) in FIG. 6.

Figure 3A:
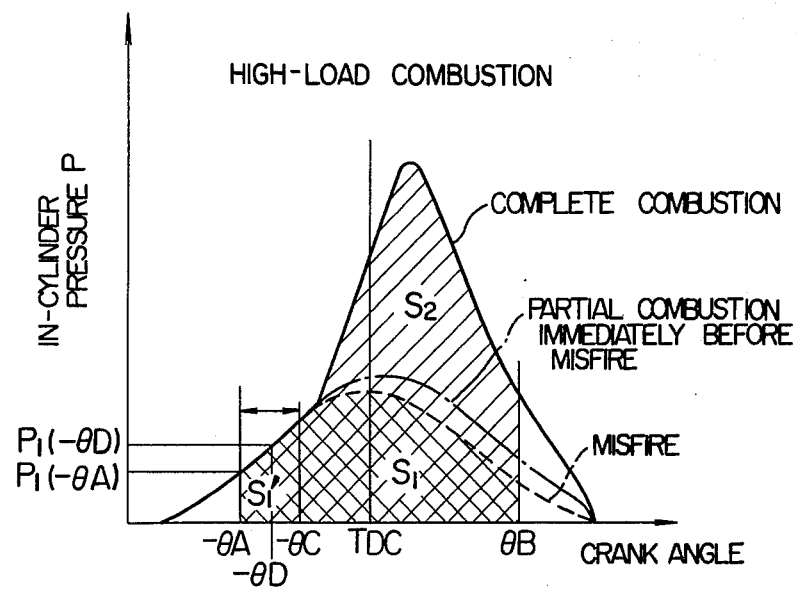
FIGS. 3a and 3b are graphs each showing the difference of the cylinder pressure waveform according to the load conditions of an ordinary internal combustion engine.
Figure 3B:
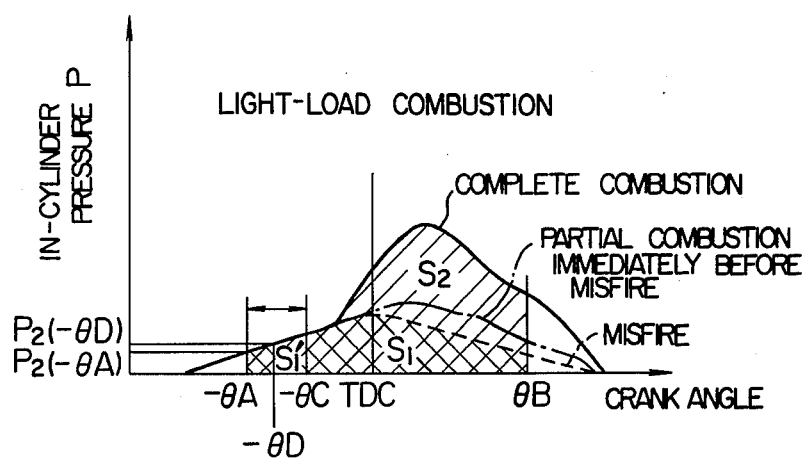

The pressure sensor 1 includes a pressure sensor 11 and a pressure sensor amplifier 12. The pressure sensor 11 is for detecting the pressure in the cylinders of the internal combustion engine and is mounted in the cylinders of the internal combustion engine. As shown in FIGS. 2 and 3, the potential of the pressure sensor 1 increases with the pressure in the cylinders. Generally, the pressure sensor 11 may be of piezo-electric, capacity or strain gauge type.

The pressure detected by the pressure sensor 11 is applied to the A/D converter 31 through the pressure sensor amplifier 12.

Now, the processor 3 will be described. The A/D converter 31 supplied with the pressure signal from the pressure sensor amplifier 12 converts the pressure signal into a digital signal at the time of each rise of the multiplication pulse signal supplied from the counter 29 and applies the digital signal to the first arithmetic 32 and the second arithmetic unit 33. The first arithmetic unit 32 is for adding the digital signal thus supplied thereto at the time of each fall of the multiplication pulse signal supplied from the counter 29, so that the pressure signal for each combustion is integrated by the signal representing the crank angle of obtain the value $S_1+S_2$ and the result thereof is applied to a third arithmetic unit 34.

The first arithmetic unit 32 is reset at the rise of the pulse signal of the first angular position $-\theta A$ supplied from the waveform shaping circuit 27.

On the other hand, the second arithmetic unit 33 latches the digital signal P $(-\theta D)$ supplied from the A/D converter 31 at the fall point of the pulse signal of the first angular position $-\theta A$, namely, at the third angular position $-\theta D$ while at the same time calculating the value $S_1$ representing the area for the hypothetical misfire by multiplication of the predetermined value $V_2$, which value $S_1$ is applied to the third arithmetic unit 34.

The third angular position $-\theta D$ of the internal combustion engine is a predetermined angular position before explosion/combustion of the mixture gas in compression stroke.

In response to the signal supplied from the counter 29 when N pulses are counted (at (E) in FIG. 6), the third arithmetic unit 34 receives a signal representing the area $S_1+S_2$ of combustion supplied from the first arithmetic unit 32 and a signal representing the area $S_1$ of misfire supplied from the second arithmetic unit 33 thereby to determine the ratio $(S_1+S_2)/S_1$. This ratio is compared with the predetermined value $\alpha$ representing a standard of combustion, and if the ratio $(S_1+S_2)/S_1$ is larger than $\alpha$, a pulse signal as shown at (C) in FIG. 6 is produced from the third arithmetic unit 34.

The processes of operation of the ignition range detecting apparatus for the internal combustion engine according to the present invention will be described in detail below with reference to FIG. 6.

In FIG. 6, reference character (A) denotes a pulse signal from the first angular position $-\theta A$ to the third angular position $-\theta D$ of the internal combustion engine, which is obtained by the slit sensor 25 detecting the passage of the slits 24a associated with the first angular position and formed in the slit disc 24, and waveform-shaping it through the second waveform shaping circuit 27. Character (B) designates a signal associated with a crank angle which takes a form of pulse signal generated for each crank rotation of, say, 8 degrees. This signal is obtained in such a manner that the passage of the slit 24b corresponding to each 8 degrees cut in the slit disc 24 is detected by the slit detector 25, and the resulting signal is waveform-shaped by the first waveform shaping circuit 26. Character (C) designates a pulse signal obtained by doubling the signal associated with crank angle at the multiplier circuit 28. Character (D) designates N multiplication pulse signals produced from the first angular position $-\theta A$ to the second angular position $+\theta B$. This signal is a multiplication pulse signal which is produced by the counter 29 for each multiplication pulse from the multiplier circuit 28 while the counter 29 counts a predetermined number N of pulses (a value corresponding to the second angular position $-\theta B$) from the rise point of the pulse signal (first angular position $-\theta A$) of the second waveform shaping circuit 27. This signal actuates the A/D converter 31 at the rise point thereof and converts the pressure signal into a digital signal (the point of black dot in the graph of FIG. 6) on the one hand and actuates the first arithmetic unit 32 at the fall point thereof on the other hand, so that the pressure signal is added for each multiplication pulse signal by the first arithmetic unit 32. By the end of this signal, therefore, N digitized pressure signals have been added, thus making it possible to obtain from the arithmetic unit 32 the value $S_1+S_2$ representing the area by integrating the in-cylinder pressure by a signal associated with the crank angle.

The second arithmetic unit 33, on the other hand, latches the digitized pressure signal P $(-\theta D)$ supplied from the A/D converter 31 at the third angular position $-\theta D$, namely, the fall point of the pulse signal of the first angular position $-\theta A$ supplied from the waveform shaping circuit 27, so that the latched value is multiplied by $K_2$. It is thus possible to obtain the value $S_1$ corresponding to the area which is the result of integrating the pressure signal for misfire under the same condition by a signal associated with the crank angle. The values $S_1+S_2$ and $S_1$ thus obtained from the two arithmetic units are read by the third arithmetic unit 34 in response to the signal of FIG. 6(E) produced at the end of counting of the N multiplication pulse signals, thus determining the ratio between $S_1+S_2$ and $S_1$. This ratio $(S_1+S_2)/S_1$ is compared with a predetermined value $\alpha$ (1 or more) providing a standard of combustion, and if the ratio is larger than $\alpha$, the pulse signal of FIG. 6(G) is produced. This operation is performed by the third arithmetic unit 34 during the pulse width of the signal FIG. 6(G).

In other words, upon complete combustion, the third arithmetic unit 34 produces a pulse signal, while at the time of misfire or partial combustion immediately before misfire, the third arithmetic unit 34 fails to produce a pulse signal. In this way, the state of partial combustion immediately before misfire, that is, an ignition range is capable of being detected.

In the aforementioned embodiment of the apparatus according to the present invention, the signal associated with the crank angle is used in the form of a multiplied pulse signal for the slit passage, and the multiplication signal is obtained by multiplying the time between pulses on the basis of the time between preceding pulses. If the rotation of the internal combustion engine 4 is stable all the time, therefore, the multiplication up to as large as 10 or 20 times may be obtained; while if the rotation of the internal combustion engine 4 is unstable, the error becomes great for the multiplication system. In such a case, the number of the slits 24*b* is increased to reduce the multiplications, or the number of the slits 24*b* is increased to use only the pulse signal of the slits.

It is also obvious that as an alternative to the slit disc 24, other angle sensor of appropriate form may be used as a device for detecting the rotational angle of the crank shaft 41 of the internal combustion engine 4.

Further, in the above-mentioned embodiment of the apparatus according to the present invention, the detection of the first angular position $-\theta A$ of the internal combustion engine 4 and the counting of the pulse signal associated with the crank angle are used to determine the second angular position $-\theta B$ and the third angular position $-\theta D$. Instead of this method, these angular positions may be of course be detected directly with equal effect.

Furthermore, the apparatus according to the embodiment of the present invention described above is comprises of a digital circuit, which may be replaced by an analog circuit. In such a case, the pressure signal is integrated by time from a predetermined first angular position $-\theta A$ before explosion/combustion of the mixture gas in compression stroke to a predetermined second angular position $+\theta B$ in expansion stroke after top dead center to determine the value $S_1+S_2$; and the pressure between the first angular position $-\theta A$ and a predetermined angular position $-\theta C$ after the first angular position $-\theta A$ before the explosion/combustion of the mixture gas in compression stroke (FIG. 3) is integrated by time and multiplied by $K_1$ to determine the value $S_1$ for misfire. The ratio of these two values $S_1+S_2$ and $S_1$ is compared with a predetermined value $\alpha$, thus making it possible to detect an ignition limit value of the internal combustion engine in similar manner.

Although the above-described embodiment of the apparatus according to the present invention concerns the case in which only one cylinder is provided with the pressure sensor 11, the pressure sensor 11 may be provided on each of a plurality of cylinders in such a manner that the signals from the pressure sensors 11 are added, and the slits 24*a* are formed in the slit disc 24 at first angular positions $-\theta A$ corresponding to the top dead center of each cylinder.

Figure 7:
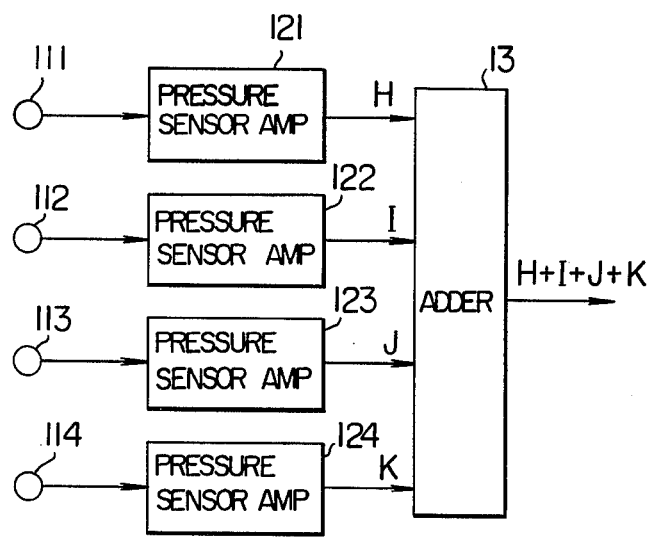
FIG. 7 is a block diagram showing another embodiment of the present invention.
Figure 8:
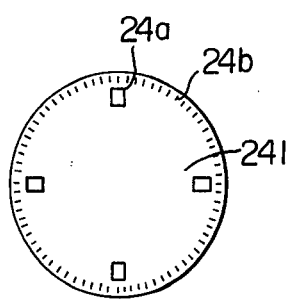
FIG. 8 is a plan view of a slit disc used in the embodiment of FIG. 7.

A block diagram of another embodiment of the present invention is shown in FIG. 7, and a top plan view of the slit disc used in the apparatus of FIG. 7 is shown in FIG. 8.

In FIG. 7, numerals 111, 112, 113 and 114 designate pressure sensors mounted on the cylinders, and numerals 121, 122, 123 and 124 designate pressure sensor amplifiers. Numeral 13 designates an adder for producing outputs H+I+J+K in response to inputs, H, I, J and K thereto. In FIG. 8, numeral 241 designates a slit disc formed with slits for angular positions $-\theta A$ for each cylinder.

Simple addition as shown in FIG. 7 poses no problem as it hardly affects the cylinders in view of a small pressure change in intake or exhaust stroke.

It will be understood from the foregoing description that according to the present invention at each combustion, the pressure in the cylinders of the internal combustion engine is integrated by the signal associated with the crank angle from the first predetermined angular position $-\theta A$ of the internal combustion engine in compression stroke before explosion/combustion of the mixture gas to the second predetermined angular position $+\theta B$ in expansion stroke thereby to produce a value $S_1+S_2$, while at the same time calculating a value $S_1$ by integrating the pressure waveform of misfire under the same condition by the signal associated with the crank angle. The ratio of these two values, i.e., $S_1+S_2$ and $S_1$ is compared with a predetermined value $\alpha$ representing the combustion state of the internal combustion engine, and it is decided whether or not the ratio $(S_1+S_2)/S_1$ is higher than the value $\alpha$. In other words, it is possible to detect whether the complete combustion is involved ($\alpha$ is exceeded) or partial combustion is involved ($\alpha$ is not exceeded). Thus the partial combustion immediately before misfire can be detected always regardless of the operating conditions of the internal combustion engine, making it possible to detect an ignition range always in stable manner.

Further, the ignition range which is affected by the air-fuel ratio, exhaust gas recirculation or ignition timing can be detected over a wide range.

We claim:

1. An ignition range detector for an internal combustion engine comprising a pressure sensor for detecting the pressure in a cylinder of an internal combustion engine, a crank angle sensor for detecting a first angular position of said internal combustion engine in compression stroke before a combustion and a second angular position of said internal combustion engine in expansion stroke, a processor including a computer for processing a pressure signal from said pressure sensor at each combustion and integrating said pressure signal by a signal associated with the crank angle from said crank angle sensor from said first angular position to said second angular position thereby to calculate a value $S_1+S_2$, said computer further integrating said pressure signal for a hypothetical case of misfire under the same conditions thereby to calculate a value S, said computer further including means of producing the ratio $(S_1+S_2)/S_1$ and comparing said ratio with a predetermined value $\alpha$ and producing the result of said comparison.

2. An ignition range detector according to claim 1, wherein said processor includes first arithmetic means for integrating said cylinder pressure signal detected at each combustion, from said first angular position to said second angular position by said signal associated with the crank angle, second arithmetic means for integrating said cylinder pressure for a hypothetical case of misfire under the same condition of the internal combustion engine from said first angular position to said second angular position by said signal associated with the crank angle, and a third arithmetic means for comparing the ratio $(S_1+S_2)/S_1$ between said two integrations obtained from said first and second arithmetic means with a predetermined value $\alpha$.

3. An ignition range detector according to claim 1, wherein said crank angle sensor includes a slit disc for detecting said first angular position and said second angular position.

4. An ignition range detector according to claim 1, wherein said pressure sensor is a piezoelectric type.

5. An ignition range detector according to claim 1, wherein said pressure sensor is of capacity type.

6. An ignition range detector according to claim 1, wherein said pressure sensor is of strain gauge type.

* * * * *